INCLINED MOVING WALKWAY ARRANGEMENT

Original Filed March 27, 1967 5 Sheets-Sheet 1

INVENTORS
RANDOLPH H. JACKSON
BYRON J. EDDY
KENNETH D. MITCHELL
ERNEST D. JOHNSON
CHARLES G. HALL
JAMES E. HICKS

BY
Mann, Brown & McWilliams
ATTORNEYS

INCLINED MOVING WALKWAY ARRANGEMENT

Original Filed March 27, 1967 5 Sheets-Sheet 2

INVENTORS
RANDOLPH H. JACKSON
BYRON J. EDDY
KENNETH D. MITCHELL
ERNEST D. JOHNSON
CHARLES G. HALL
JAMES E. HICKS

BY
Mann, Brown & McWilliams
ATTORNEYS

INCLINED MOVING WALKWAY ARRANGEMENT
Original Filed March 27, 1967 5 Sheets-Sheet 3
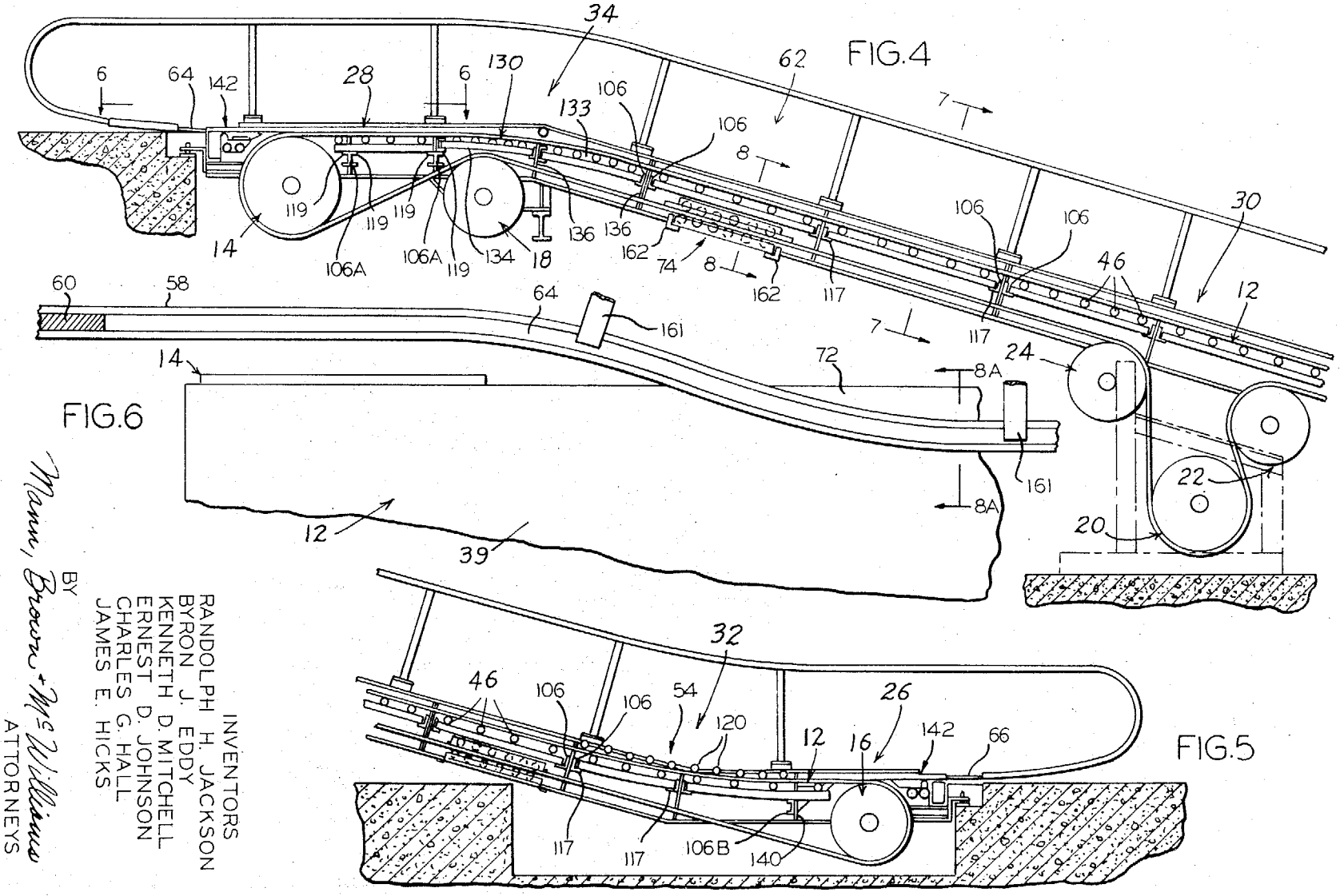
INVENTORS
RANDOLPH H. JACKSON
BYRON J. EDDY
KENNETH D. MITCHELL
ERNEST D. JOHNSON
CHARLES G. HALL
JAMES E. HICKS
BY
Mann, Brown & McWilliams
ATTORNEYS

INCLINED MOVING WALKWAY ARRANGEMENT

Original Filed March 27, 1967 5 Sheets-Sheet 4

INVENTORS
RANDOLPH H. JACKSON
BYRON J. EDDY
KENNETH D. MITCHELL
ERNEST D. JOHNSON
CHARLES G. HALL
JAMES E. HICKS
BY
Mann, Brown & McWilliams
ATTORNEYS

INCLINED MOVING WALKWAY ARRANGEMENT

Original Filed March 27, 1967 5 Sheets-Sheet 5

INVENTORS
RANDOLPH H. JACKSON
BYRON J. EDDY
KENNETH D. MITCHELL
ERNEST D. JOHNSON
CHARLES G. HALL
JAMES E. HICKS
BY
Mann, Brown & McWilliams
ATTORNEYS United States Patent Office Re. 27,439
Reissued July 18, 1972

27,439

INCLINED MOVING WALKWAY ARRANGEMENT

Randolph H. Jackson, Evanston, Ill., Byron J. Eddy, North Olmsted, Kenneth D. Mitchell, Copley, Ernest D. Johnson, Tallmadge, and Charles G. Hall, Akron, Ohio, and James E. Hicks, Lake Geneva, Wis., assignors to The Goodyear Tire & Rubber Company, Akron, Ohio Original No. 3,414,108, dated Dec. 3, 1968, Ser. No. 626,003, Mar. 27, 1967. Application for reissue Sept. 25, 1970, Ser. No. 26,979

Int. Cl. B66b *9/12*

U.S. Cl. 198—16 21 Claims

Matter enclosed in heavy brackets [ ] appears in the original patent but forms no part of this reissue specification; matter printed in italics indicates the additions made by reissue.

ABSTRACT OF THE DISCLOSURE

This invention relates to an inclined moving walkway arrangement of the moving sidewalk type in which the walkway is defined by an endless conveyor belt member that is built for lateral stiffness but adequate longitudinal flexibility for belt training purposes, with the belt being trained between end pulleys on wheel-like rollers that support the side edges of the belt, with no solid support through the center of the belt, such as a slider plate, being employed for most of the length of the conveyor. The moving walkway arrangement for the first time provides both a level entry and a level exit that is defined by the belt training arrangement, and a moving hand rail is provided which is driven by having its lower run releasably clamped to the lower run of the belt instead of having the hand rail driven through take off mechanisms from the conveyor driving end pulley.

Conventional moving sidewalk or moving walkway arrangements ordinarily involve an endless conveyor in the form of a ribbon belt of rubber or the like moving on either a slider plate type bed arrangement or a roller type bed arrangement made up of closely spaced rollers that extend the width of the belt.

While slider bed conveyor arrangements provide good support for the belt under the belt's passenger load, the drag of the belt on the slider bed greatly restricts practical conveyor lengths because of tension requirements on the belt.

Roller bed type arrangements greatly reduce the drag problem on the belt, but because of the bumpy conveyance given passengers as they are moved from one roller to another, this type of conveyor has not been considered practical for moving sidewalk or walkway passenger conveying purposes.

Moreover, neither the slider bed type arrangement nor the roller bed type arrangement have permitted the use of a level entry or a level exit at the lower end of an inclined moving walkway apparatus due to the fact that the high tension in the belt has made it impractical to have the belt define the concave curve at the base of the inclined portion that would be necessary to have the belt provide the level exit or entry. The tension involved is in the system not only to establish a driving traction with the belt but also because of the load on the belt created by passengers being pulled up or down the inclination.

Furthermore, the conventional hand rail arrangement for apparatus of this type has heretofore involved and endless hand rail member trained over a balustrade guide, and heretofore the hand rail driving and return arrangements involved have been disposed above the level of the conveyor, necessitating the use of a double panel arrangement to cover up from within and without the conveyor the chains and sprocketing or similar mechanical motion transmitting structures involved for aesthetic purposes, and have made it impractical to use a transparent balustrade.

A principal object of this invention is to provide an inclined moving walkway arrangement that not only eliminates the drag problem of slider bed type arrangements and the bumpy ride problem of roller bed type arrangements, but also in the same conveying unit provides both a level entry and a level exit for the conveyor while avoiding the need for solid support at the center of the conveyor belt for most of the length of the conveyor.

Another principal object of the invention is to provide an inclined moving walkway arrangement in which balustrade consists of one fixed panel, and the use of a transparent balustrade is a practical option.

Still another principal object of the invention is to provide a hand rail drive for moving walkway arrangements that eliminates the need for separate driving mechanisms to move the hand rail, that provides a driving force to the hand rail that is inherently synchronized with the speed of the moving walkway, and takes advantage of the movement of the moving walkway itself to drive the hand rail.

Yet another object of the invention is to provide a hand rail arrangement and drive therefor that makes it feasible to lubricate the inner surface of the hand rail.

Further objects of the invention are to provide a moving walkway arrangement which has a passenger conveying surface that is as level for passenger comfort as can be achieved by a slider bed arrangement but which has a practical operating length that is equivalent to that achieved by roller bed supported arrangements, to provide an inclined moving walkway arrangement that operates on the consistently effective basis required for use as a public conveyance, and to provide an inclined moving walkway arrangement that is economical of manufacture, convenient to install and use, and readily adapted for application to a wide variety of passenger conveyor situations.

Still other objects, uses and advantages will be obvious or become apparent from a consideration of the following description and the application drawings in which like reference numerals are used to designate like parts throughout the several views.

In the drawings:

FIG. 4 is a side elevational view of a specific inclined moving walkway arrangement of the type shown in FIG. 1 with parts shown in section and illustrating only the upper level end of the conveyor and the inclined mid portion;

FIG. 5 is a side view similar to that of FIG. 4 showing the lower end of the conveyor arrangement of FIG. 4;

FIG. 6 is a diagrammatic fragmental plan view substantially along line 6—6 of FIG. 4 illustrating the manner in which the lower run of the hand rail is guided from the balustrade into cooperation with the lower run of the conveyor belt in accordance with this invention;

However, it is to be understood that the specific draw-ng illustrations provided are supplied primarily to com-ly with the requirements of the Patent Code and that he invention may have other embodiments which will be bvious to those skilled in this art and which are intended o be covered by the appended claims.

GENERAL DESCRIPTION

Figure 1:
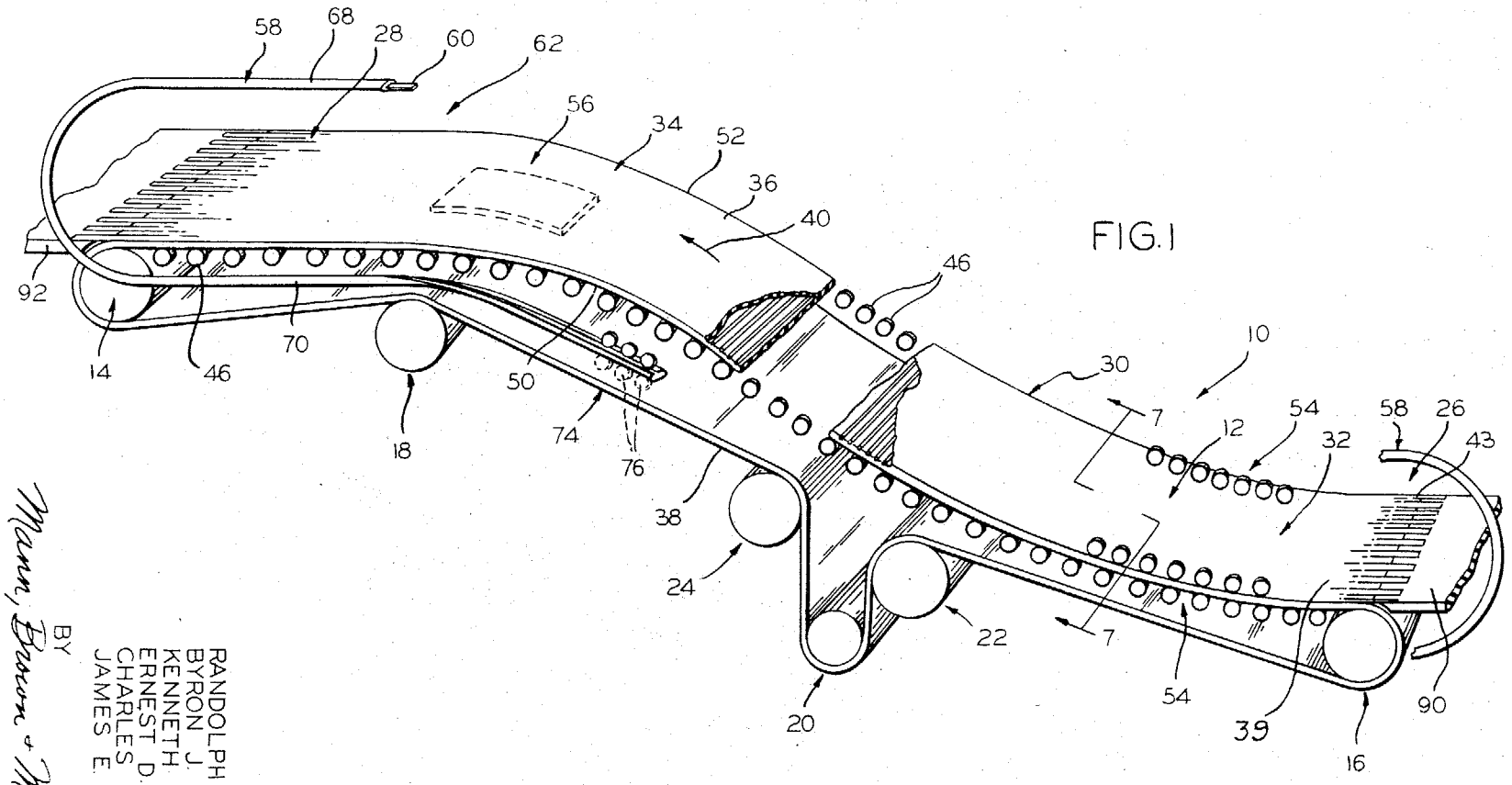
FIG. 1 is a diagrammatic perspective view illustrating the principal features of the invention.
Figure 2:
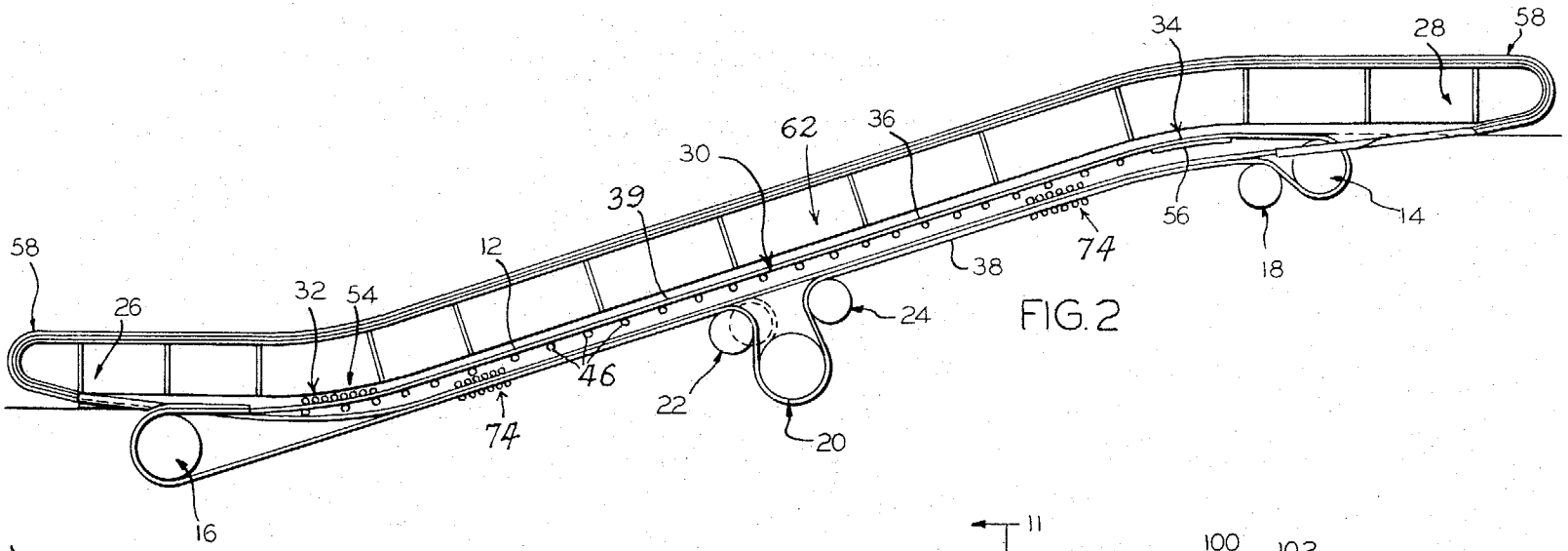
FIG. 2 is a side elevational view taken from the far side of the apparatus shown in FIG. 1 showing the arrangement diagrammatically but with somewhat greater detail.

Reference numeral 10 of FIG. 1 generally indicates a liagrammatically illustrated embodiment of this invention vhich comprises an endless conveyor belt 12 trained over-ead and tail pulleys 14 and 16, head snub pulley 18, rive pulley 20, take up pulley 22, and drive snub pulley 4, and shaped to define a level entry 26, a level exit 28, nd an inclined portion 30 that is connected to the entry 6 by concave portion 32 and is connected to the exit ortion 28 by convex portion 34.

The conveyor 12 is a continuous ribbon belt defining pper run 36 and lower run 38 and moves in the direction ndicated by the arrow 40 in the arrangement illustrated. When the apparatus 10 moves in the other direction, the ntry to the apparatus 10 is at the upper end of the con-eyor while the exit 28 is at the lower end, as will be mmediately apparent, and it is preferred that the drive ctuating drive pulley 20 be reversible. However, for pur-oses of this description it will be assumed that the belt s moving so that the upper run 36 is moving upwardly n the direction of the arrow 40 and the entry 26 and the xit 28 are located as indicated.

The conveyor member 12 thus defines a continuous ransport surface 39 on the upwardly facing side of the pper run 36 composed of the entry portion 26, the con-ave portion 32, the convex portion 34, and the exit por-ion 28 in that order.

Figure 12:
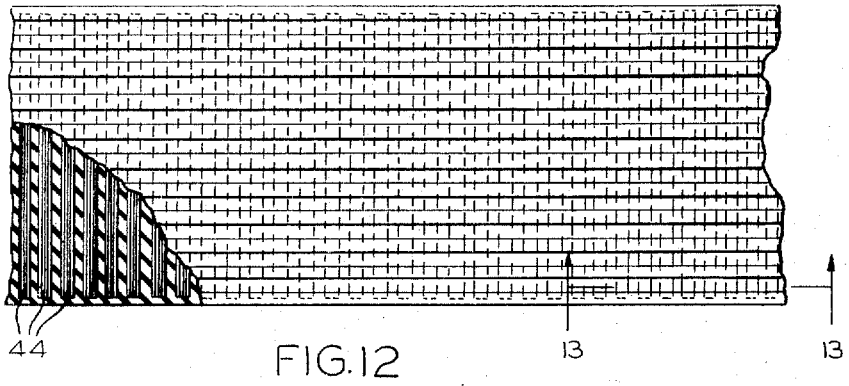
FIG. 12 is a plan view of a fragment of the conveyor elt used in accordance with this invention, with parts eing broken away to better illustrate details.
Figure 13:
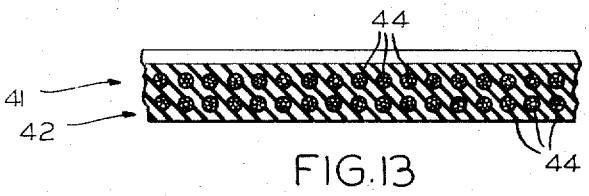
FIG. 13 is a fragmental cross-sectional view along line 3—13 of FIG. 12.

In accordance with this invention, the conveyor member 2 is a composite laminated construction (see FIGS. 12 nd 13) comprising two layers 41 and 42 of closely paced cables formed from steel or the like embedded vithin a suitable belt forming elastomer that can be of natural or synthetic rubber composition or a synthetic esin composition such as a plasticized polyvinyl chloride omposition. The cables 44 are closely spaced and a spac-ng on the order of 1/16 to 1/8 of an inch is preferred; as ndicated in FIGS. 1, 12 and 13, the cables 44 extend ransversely of the conveyor belt 12 and thus at right angles to its longitudinal axis. This gives the conveyor member 12 substantial lateral stiffness while providing for substantial flexure longitudinally thereof that permits the belt to be readily flexed about the illustrated pulleys.

Preferably, the surface of belt 12 defining transport surface 39 is formed with a plurality of shallow closely spaced longitudinally extending grooves 43 that are pref-erably on the order of 1/4 inch deep and are spaced on the order of 1/4 inch apart, which thus define spaced ribs 45.

Further in accordance with this invention, the upper run of the belt is supported between its head and tail pulleys, and on either side thereof, by wheel type rollers 46.

Figure 7:
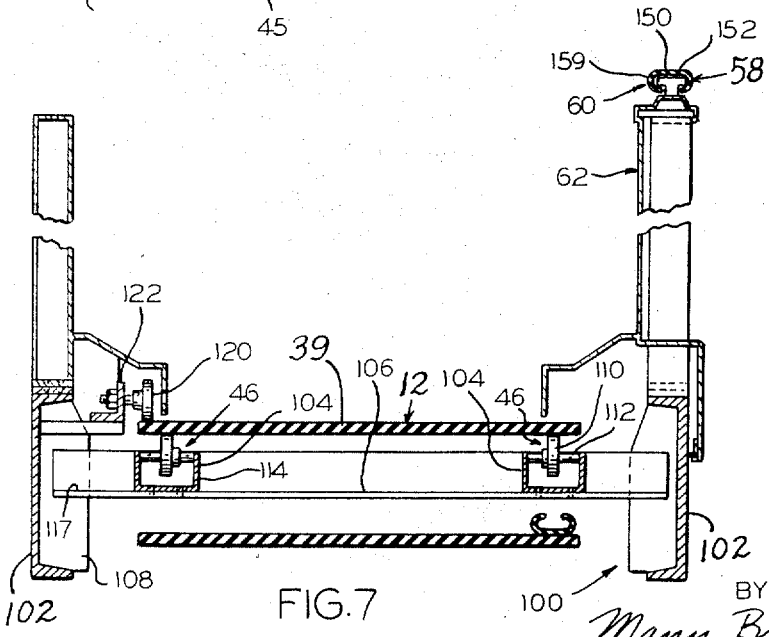
FIG. 7 is a cross-sectional view through a typical por-ion of the inclined moving walkway and for purposes of he description it is taken substantially along line 7—7 f FIG. 1.

It will be noted from FIG. 7 that the rollers 46 have a dimension transversely of the belt that is on the order of the belt thickness and that they are positioned closely adjacent to the opposing edges 50 and 52 of the belt. As indicated in FIG. 1, the conveyor 12 has no solid support along its longitudinal center except for the special fea-tures now to be pointed out to thus define between said edges 50 and 52 and their supporting rollers 46 a smooth pathway along which the passengers are moved that avoids the bumpy conveyance of conventional roller beds and yet provides adequate support for the passengers due to the internal stiffness of the belt.

Figure 11:
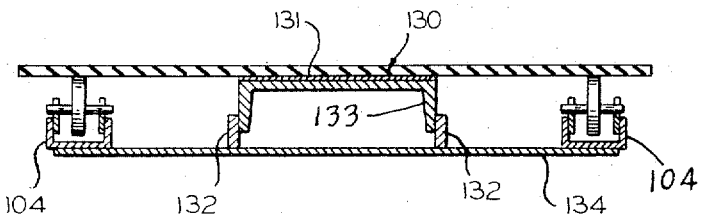
FIG. 11 is a transverse cross-sectional view along line 1—11 of FIG. 3, showing the upper run of the conveyor elt in its operating position.

At the concave portion 32, the belt 12 is held down at its edges 50 and 52 against the tension in the belt by roller hold down devices 54, while at the convex portion 34 of the belt a narrow supporting plate or prop structure 56 is provided across the length of the convex portion (longitudinally of the belt) which has a dimension trans-versely of the belt on the order of 1/3 the belt width (see FIG. 11).

Associated with the conveyor belt 12 is an endless hand rail 58 mounted on a suitable guide 60 that is secured about the top and ends of balustrade 62.

In accordance with this invention, the hand rail 58 is moved or driven by releasably clamping same to the lower run 38 of the conveyor 12. The hand rail is positioned for this by employing the special guide bars 64 and 66 that are shown in FIGS. 4–6 to guide the hand rail from the plane of the balustrade to a position in between the upper and lower runs of the conveyor at the exit end there-of and from that relative position back to the plane of the balustrade at the entry end thereof.

The hand rail 58 thus defines an upper run 68 that is disposed in the usual position for hand gripping by pas-sengers riding the conveyor 10, and a lower run 70 which on its downward movement is guided into the [spaced] *space* between the conveyor belt upper and lower runs.

In accordance with this invention, the hand rail lower run 70 is clamped to the upwardly facing surface 72 (the inside surface of the belt) of the conveyor lower run 38 by one or more clamping devices 74.

Figure 8:
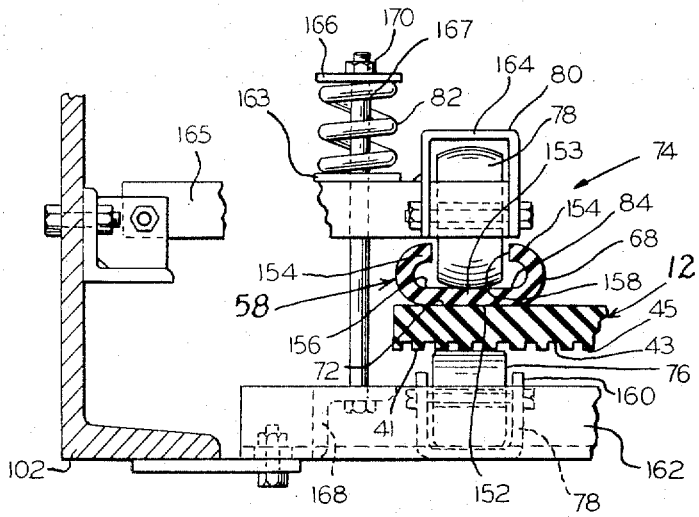
FIG. 8 is a fragmental cross-sectional view taken sub-tantially along line 8—8 of FIG. 4 and illustrating the rrangement for clamping the hand rail to the lower run f the conveyor for purposes of driving the hand rail.

In the specific embodiments illustrated, the clamping devices 74 are two in number and are located within the inclined portion 30 of the apparatus 10 adjacent the con-cave and convex portions 32 and 34, respectively. The specifics of the devices 74 are illustrated in FIG. 8, where-in it will be seen that each comprises a lower set of rollers 76 journalled in a fixed base [78] *75* that engage the grooved load supporting surface 39 of the lower or return run of the belt, and upper rollers 78 journalled in a frame 80 that are held in clamping engagement with the hand rail 68 by springs 82. It will be noted that the rollers 78 in the form of FIGS. 1–8 ride on the inside surface 84 of the hand rail.

When the apparatus 10 is moved in the direction that will move the upper run of the belt in the direction of arrow 40, it is the upper clamping device 74 that does the main driving action on the hand rail, with the bottom or lower device 74 pulling the slack in the hand rail away from the area of the drive roller 20 and its cooperating rollers 22 and 24. More specifically, the clamping devices 74 act as a single unit, providing simultaneous pulling and pushing forces on the handrail so that the handrail is pulled around the upper guide structure 60 from the midpoint of the lower newel curve to the clamping devices and pushed past the lower special guide bar 66 to the midpoint of the lower newel curve. The action is reversed when the direction of movement is reversed.

In operation, the drive actuating drive pulley 20 is actuated in any suitable manner to move the conveyor belt 12, for instance, in the direction indicated by the arrow 40, with passengers stepping from landing 90 directly onto the conveyor level entry portion 26 and gripping the hand rail upper run 68, if desired, for support, which, in moving at the same speed as the conveyor, avoids the possibility of passengers being thrown of balance. The conveyor belt 12 is driven at the conventional moving sidewalk speed of a mile and one-half an hour and the passengers experience a smooth ride across the entry portion 26, the concave portion 32, and up the inclined portion 30. The plate structure 56 at the convex portion 34 supports the mid portion of the belt under the weight of the passengers so that as they ride over it the belt in the area of the convex portion is maintained level transversely thereof and the passengers experience no uncertainty due to a dip being formed at the longitudinal center of the belt at this area of the conveyor. The passengers continue to move smoothly onto the exit portion 28 and thence to the fixed upper landing 92.

The hand rail drive provided by this invention inherently effects the driving of the hand rail at the same speed as the conveyor 12 without having to use chain and sprocket type mechanical motion transmitting structures or the like and the large driving and idler hand rail engaging sheaves, usually located at the side of the conveyor at each end thereof, to drive the hand rail off the head or other pulley of the conveyor. Consequently, conventional balustrade double panelling employed to hide such mechanisms may be eliminated and the balustrade may be a single panel in thickness, which may optionally be transparent to the extent desired, thereby reducing the overall width of the unit and creating a slimmer silouette that is highly compatible with modern architecture.

SPECIFIC DESCRIPTION

The conveyor pulleys and support rollers 46 are mounted on a suitable framework 100 which as shown in FIG. 7 in the form illustrated comprises spaced channel members 102 fixed in place in any suitable manner on which the balustrades 62 are fixed in any suitable manner. The structural arrangement of and journalling for the conveyor pulleys may be of any conventional type and is not illustrated in the drawings in any great detail.

In the form shown, the conveyor belt upper run supporting rollers 46 are journalled in removably mounted channel shaped racks or holders 104 that are fixed between spaced support members 106 that extend transversely of the conveyor belt 12 and are in turn fixed between the respective channel members 102 in any suitable manner, such as being affixed to webs 108 that are in turn fixed to the respective members 102.

The individual rollers 46 each comprise a wheel member 110 keyed to a spindle 112 which is appropriately and preferably removably journalled between the side walls 114 of the respective supporting channel members 104. It will be noted from the showing of FIG. 3 that the rollers [112] *46* of most of the holders 104 are staggered transversely of the belt to reduce wear and in practice the rollers 46 have a dimension transversely of the belt on the order of ½ an inch.

Preferably, the roller holders 104 are releasably secured in place, as by employing bolts or the like, so that they may be separately removed as required to service and/or replace the roller devices 46 they carry. As indicated in FIGS. 4 and 5, the support members 106 for holders 104 angle members, I-sectioned members or the like that include flange portions 117 and 119 on which the holders 104 seat on either side of the conveyor.

The hold down devices 54 at the concave portion 32 are in the form of rollers 120 in sets on either side of the conveyor and in practice comprise a plurality of rollers 120 journalled on an angle member 122 which is in turn held in place in any suitable manner as by being affixed to the adjacent portion of the main channel member 102. As indicated at the left hand side of FIG. 7, the rollers 120 ride at the very edge of the transport surface on either side of the conveyor 12 across the length of the concave portion 32, and thus are to one side of the adjacent rollers 46, thereby acting on the belt through a leverage system. *Trim members extending inwardly from the balustrades 62 cover the rollers 120 and substantially overlie the belt supporting wheels 46 as further shown in FIG. 7.*

Figure 3:
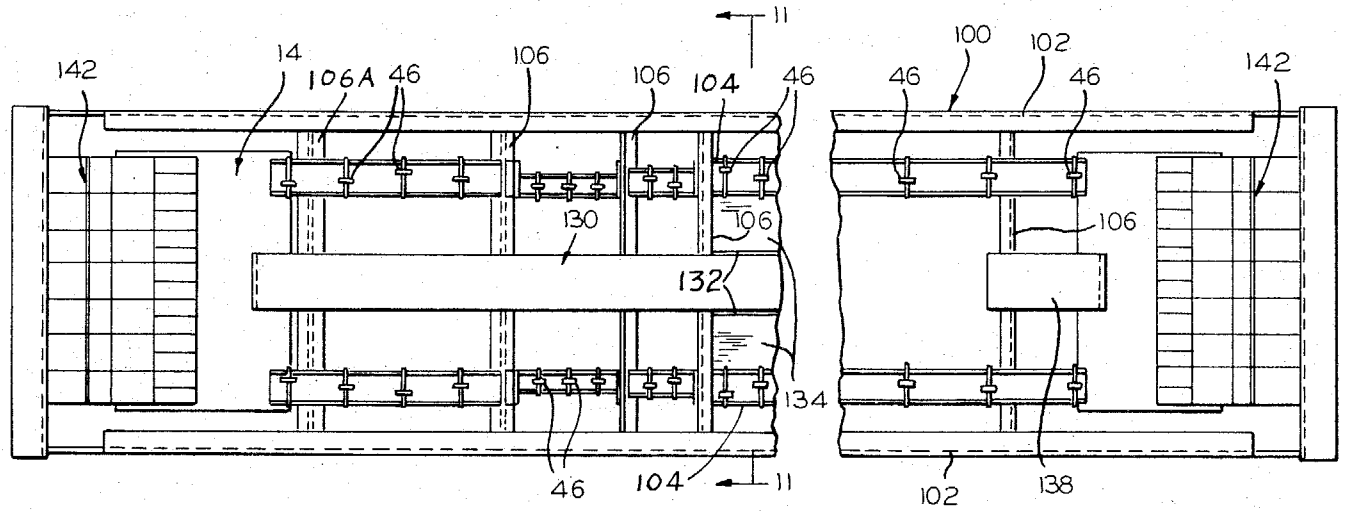
FIG. 3 is a plan view of the upper and lower ends of the specific arrangement that is shown in FIGS. 4 and 5 with the conveyor belt omitted and the central portion of the apparatus broken away.

The plate structure 56 at the convex belt portion 34 in practice need be applied only across the length of the convex portion longitudinally of the belt, but in the specific form shown in FIGS. 3–5, the plate structure is in the form of an elongate plate structure 130 provided with a wear resisting surface 131 (see FIG. 11) and that extends from a point adjacent the head pulley 14 to the point on the conveyor 12 somewhat beyond where inclined portion 30 thereof is tangent with the [concave] *convex* portion 34 (see FIG. 4) to provide smooth transition for the passenger's weight riding onto plate structure 56 and from the plate structure 56 to the platform 92 (and its floating comb plate device 142). In this form, the plate structure 130 is in the form of a channel member 133 (see FIG. 11) mounted in place by being affixed as by welding to ribs 132 that are in turn fixed to a web plate 134 that is connected between the two channel shaped holders 104 of the rollers 46 at the exit side of belt convex portion 34. The plate structure 130 extends to the left of FIG. 4 for support by end support members 106A and to the right of FIG. 4 down over the convex portion 56.

The rollers 46 at the belt portions 28 and 34 are mounted in place so that their upwardly disposed peripheries project above the surface 131 a distance on the order of ¼ inch, to permit belt 12 to ride free of plate structure 56 under no load conditions.

At the level entry 26, the conveyor 10 is provided with a short support plate structure 138 that is indicated in FIGS. 3 and 5 to provide a smooth transition between fixed platform 90 (and its floating comb plate device 142) and the belt 12. Again, the rollers 46 adjacent same are mounted in place so that their upper peripheries are disposed above plate structure on the order of ¼ inch.

This plate structure 138 is indicated in FIG. 5 as being supported by the adjacent end transverse support member 106B, and has a width laterally of the belt similar to that of plate structure 56.

It is preferred that a floating comb plate device of the type described in U.S. Pat. 3,071,234 be applied where indicated at 142 at the entry and exit ends of the conveyors as a safety feature.

In the forms of FIGS. 1–8, the hand rail 68 is of conventional form and has the usual C-shaped configuration defining an endless band member 150 (see FIG. 8) provided with a continuous, relative flat hand grip surface 152 on the exterior of its back 153 and hooked edges or flanges 154 which form a continuous recess 156 provided with a continuous open mouth 158 through which the clamping rollers 78 of device 74 have access to internal surface 84 of back 153.

As indicated in FIG. 7, the hand rail is supported on the upper or top portion of the balustrade 62 on a guide structrue 60 having a complementarily shaped exterior 159 and is in sliding engagement therewith, although a suitable roller support may be employed if so desired. The hand rail guide 60 continues on around the ends of the balustrade and in the return direction where at the upper and lower ends of the conveyor the guide 60 has secured hereto the respective special guide bars 64 and 66 that continue the projection of the guide 60 but bend the hand rail out of the plane of the balustrade and into the space between the conveyor upper and lower runs in the manner suggested in FIG. 6 for guide bars (the guide bar 66 is similarly arranged but in reverse manner).

Figure 8A:
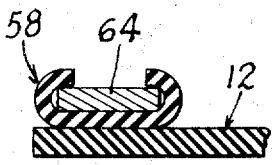
*FIG. 8A is a fragmental cross-sectional view along ine 8A—8A of FIG. 6;*

As indicated in FIG. 8A, the guide bars 64 and 66 widthwise substantially complement the width of the hand rail recess 156 to slidably guide the hand rail between the positions indicated. The bars 64 and 66 are secured in place in any suitable manner, as by fixing supporting straps 161 (see FIG. 6) to the main channel supports 12.

The clamping roller devices 74 each specifically comprise a channel member 160 that forms base 78 and is fixed between spaced angle members 162 that are fixed between the conveyor main channel members 102 in any suitable manner such as that suggested in FIG. 8 with the rollers 76 being journalled within the respective channel member 78 in any suitable manner for rotation about axes that extend transversely of the conveyor.

The frame 80 of each device 74 that journals the rollers 78 is in the form of a channel member 164 having fixed thereto a pair of spaced swing arms 165 that are pivotally connected to the adjacent channel members 102 for swinging movement about an axis that extends longitudinally of the conveyor. Arms 165 are joined together by a plate 163 through which extends a plurality of bolt members 167 that extend between spring seats 166 and an angle member 168 that is fixed between the respective frame members 162.

Interposed between the respective spring seats 166 and the plate 162 are the compression springs 82 that are placed under suitable compression to bias rollers 78 against the hand rail 86 by drawing nuts 170 upon the respective bolts 164.

Figure 9:
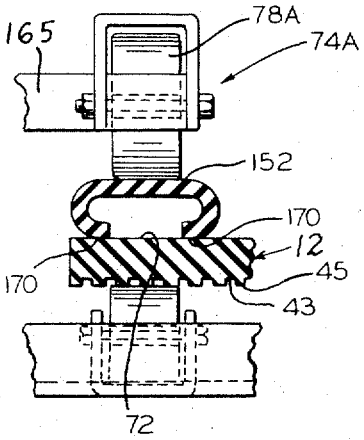
FIG. 9 is a view similar to that of FIG. 8 but illustrat-ng a modified arrangement for clamping the hand rail to he conveyor lower run.
Figure 10:
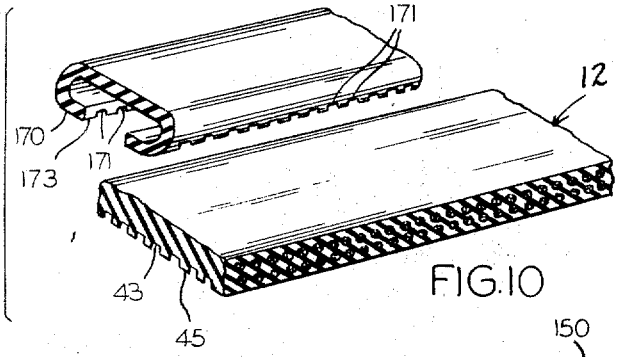
FIG. 10 is a fragmental perspective view illustrating the elation between the hand rail and conveyor lower run that s involved in the embodiment of FIG. 9.

In the form of FIGS. 9 and 10, the roller type clamping devices 74A are similar to devices 74 but their rollers 78A operate against the hand gripping surface 152 of the hand rail to press the hand rail edges or flanges 154 against the belt surface 72.

Figure 14:
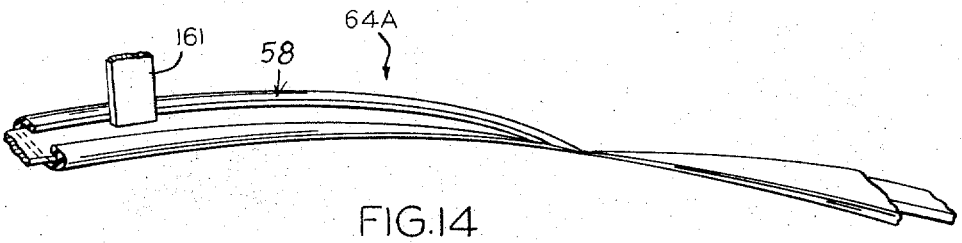
FIG. 14 is a fragmental perspective view illustrating he manner in which the hand rail of the arrangement of IGS. 9 and 10 is applied to the lower run of the con-eyor.

In this form of the invention, guide plates similar to guide plates 64 and 66 are employed to move the hand rail from the plane of the balustrade into between the upper and lower runs of the conveyor but the guide plate employed must invert the hand rail 180 degrees so that it assumes the position of FIG. 9 with respect to the lower run of the belt. The modified guide bars are thus similar to the guide bar 64A shown in FIG. 14 which in addition to providing the lateral bending indicated in FIG. 6 must have a 180 degree bend about its axis to invert the hand rail.

In this form of the invention, we prefer that the underedge portions 170 of the hand rail be serrated as at 171 in the manner indicated in FIG. 10 to provide an improved gripping action on the surface of the belt they engage. The projections 173 thus formed provide a self-wiping action on the belt surface 72 that helps eliminate the adverse effects of moisture that might be present on surface 72.

Figure 15:
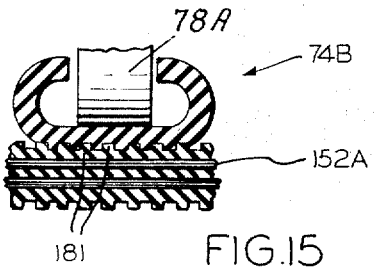
FIG. 15 is a view similar to that of FIG. 8 but illus-rating another modified arrangement for clamping the and rail to the conveyor lower run.

The clamping roller arrangement 74B of FIG. 15 is the same as that shown in FIG. 8 except that the hand gripping surface 152A of the hand rail is formed with notches 181 that complement ridges 183 formed in the inside surface 72A of the belt, and the hand rail is positioned with respect to the belt lower run so that it engages the transport surface on its return run with its respective ridges and notches aligned with the notches and ridges of the surface 72A; the compressing action of the rollers 78A is made such that the ridges of the hand rail will be pressed into the notches of the transport surface for interlocking of these components and thus establishing maximum traction between the two moving components.

The clamping arrangement of FIG. 15 provides a self wiping relation between the hand rail and the belt as well as very positive driving action with little normal force.

One of the significant benefits of the hand rail drive arrangement of this invention is that the hand rail can be lubricated inside its recess 156 to facilitate its movement about guide structure 60. Heretofore hand rails could not be lubricated at this point since the driving sheaves herefor required frictional engagement with the hand rail in this recess to establish driving traction therewith.

We claim:

1. Moving walkway apparatus for conveying passengers between floor levels at different elevations, said apparatus comprising:

a conveyor including an endless conveyor member and means for training same mounted to dispose the upper run of said member to present a transport surface defining a level entry portion at one end thereof at one of the floor levels, a level exit portion at the other end thereof at the other floor level, an inclined portion intermediate said level entry and exit portions, and convex and concave portions respectively interconnecting said entry and exit portions with said inclined portion, with the lower run of said member being disposed under said upper run, means in driving relation to said conveyor member lower run for moving said member in a forward direction to convey passengers on said surface lengthwise thereof from said entry portion to said exit portion, said endless member comprising belt means characterized by being resistant to bending laterally thereof while permitting substantial flexure longitudinally thereof, said training means comprising:

end pulley means at either end of said conveyor, and wheels positioned along either longitudinally extending edge of said run of said portions of said member, said portions of said member being suspended between said wheels of either edge thereof, roller guide means engaging said surface at either edge of said concave portion of said upper run, and prop means engaging said member upper run under said convex portion thereof along the longitudinal axis thereof for holding said convex portion of said member level transversely thereof under the weight of passengers boarding said upper run entry portion, an endless flexible hand rail member mounted at one side of said conveyor and trained to position the upper run thereof for ready gripping by the passengers, said hand rail including a hand grip surface that is upwardly disposed in said upper run, and means for coupling said hand rail member to said conveyor member for utilizing the movement of said conveyor member under the action of said moving means to move said hand rail member at the speed said conveyor member is moved, said coupling means comprising means for releasably clamping the lower run of said hand rail member to the lower run of said conveyor member, and including means for guiding said hand rail member lower run into vertical alignment with said conveyor member lower run for cooperation with said clamping means.

2. The apparatus set forth in claim 1 wherein:

said clamping means clamps said hand rail hand grip surface to said conveyor member lower run.

3. The apparatus set forth in claim 1 wherein:

said hand rail includes a serrated undersurface, said guiding means orienting said hand rail lower run to bring said hand rail undersurface into juxtaposition with said conveyor member lower run.

4. The apparatus set forth in claim 1 wherein the undersurface of said conveyor member and said hand rail hand grip surface are formed with interlocking indentations that releasably lock together under the action of said clamping means.

5. In moving walkway apparatus for conveying passengers between floor levels at different elevations including an endless conveyor member mounted to present an inclined transport surface that extends between said levels, means for moving said member in a forward direction, and an endless hand rail mounted at one side of said conveyor member and trained to position the upper run thereof for ready gripping by the passengers on said member, the improvement including:

means for guiding the lower run of said hand rail into the space between said conveyor member upper and lower runs and into juxtaposition with the undersurface of said conveyor member at the lower run thereof, and means for releasably clamping said hand rail lower run to said conveyor member lower run for driving said hand rail by said moving means through said conveyor member.

6. The improvement set forth in claim 5 wherein said clamping means comprises.

roller means engaging said hand rail, roller means engaging said conveyor member in opposition to said hand rail engaging roller means, and resilient means for biasing said hand rail roller engaging means against said hand rail to releasably clamp said hand rail to said conveyor member.

7. In moving walkway apparatus for conveying passengers between floor levels at different elevations including an endless conveyor member mounted to present an inclined transport surface that extends between said levels, means for moving said member in a forward direction, and an endless hand rail mounted at one side of said conveyor member on a balustrade and trained on said balustrade to position the upper run thereof for ready gripping by the passengers on said member, the improvement including:

means for guiding the lower run of said hand rail into and out of the space between said conveyor member upper and lower runs and into juxtaposition with the undersurface of said conveyor member at the lower run thereof, and means for releasably clamping said hand rail lower run to said conveyor member lower run for driving said hand rail by said moving means through said conveyor member, said balustrade including hand rail guide means for guiding the hand rail upper run between the ends of said transport surface and thence to and from said hand rail lower run guiding means, said balustrade thereby being free of unsightly hand rail drive mechanisms.

8. In moving walkway apparatus for conveying passengers between floor levels at different elevations in which said apparatus comprises a conveyor including an endless conveyor member and means for training same to dispose said member to form an upper run shaped to present a transport surface defining a level entry portion at one end of the conveyor at one of the floor levels, a level exit portion at the other end of the conveyor at the other floor level, an inclined portion interconnecting said entry and exit portions, and convex and concave portions respectively connecting said entry and exit portions with said inclined portion, a lower run, and means for moving said member in a forward direction to convey passengers from said entry portion to said exit portion, the improvement wherein both said entry and exit portions are made possible in an arrangement wherein said conveyor member is to be an endless ribbon belt, said improvement comprising:

an endless ribbon belt that includes stiffener means extending laterally thereof for making same resistant to bending laterally thereof while permitting substantial flexure longitudinally thereof to permit said belt to bend around pulley means, said training means comprising: pulley means including end pulley means at either end of said conveyor, and belt supporting wheels positioned to support said belt upper run between said end pulley means and along the longitudinally extending edges of the belt upper run and disposed to shape said belt upper run to define said transport surface portions when said belt upper run rides thereon, said pulley means including bend pulley means in operative relation to the belt lower run, said belt being trained over said pulley means and said wheels, means for driving one of said pulley means, means for tensioning said belt against said pulley means and said wheels whereby the drive of said one pulley means is transmitted to said belt through traction thereby established between said belt and said one pulley means, said driving means and said tensioning means comprising said moving means, said wheels having a width transversely of the belt substantially less than the width of said belt and being disposed along either of said edges of said belt upper run to define between said belt edges a smooth pathway extending lengthwise of said surface along which the pasengers are moved, roller guide means engaging said surface of said belt at said edges thereof along said concave portion of said belt upper run to hold said belt concave portion against those of said wheels defining same in opposition to the tension in said belt, and prop means positioned to engage said belt upper run when loaded under said convex portion thereof along the longitudinal axis thereof for holding said convex portion of said belt level transversely thereof under the weight of passengers being conveyed thereacross, said prop means comprising a plate member having a dimension transversely of said belt that is substantially less than the width of said belt, those of said wheels adjacent said prop means spacing the belt when unloaded above said prop means whereby said belt rides free of said prop means under no load conditions, whereby under no load conditions said belt upper run between said end pulleys is suspended between said wheels at said edges thereof, and under load conditions said prop means holds said belt upper run convex portion level transversely thereof, and whereby the belt upper run, in being resistant to bending laterally thereof, in being suspended between said wheels, and in being supported by said prop means at said convex portion when loaded, provides smooth transit for passengers along said surface at said pathway between said entry and exit portions thereof and between said wheels on either side thereof without requiring a slider bed type support for said belt upper run extending continuously between said belt entry and exit portions and said edges thereof.

9. The apparatus set forth in claim 8 including:

an endless flexible hand rail member mounted at one side of said conveyor and trained to position the upper run thereof for ready gripping by the passengers, said hand rail member including a hand grip surface that is upwardly disposed in said upper run, and means for releasably clamping a portion of the lower run of said hand rail member to a portion of the lower run of said belt for utilizing the movement of said belt under the action of said moving means to move said hand rail member at the speed said belt is moved.

10. The apparatus set forth in claim 8 wherein:

said wheels are staggered laterally of said belt at said edges thereof.

11. The apparatus set forth in claim 8 wherein:

said roller guide means comprises a plurality of rollers engaging said belt surface laterally outwardly of the location of said wheels on either of said edges of said belt.

12. In moving walkway apparatus for conveying passengers including an endless conveyor member mounted to dispose the upper run thereof to present a transport surface on which the passengers ride, means for moving said upper run of said member in a forward direction to convey the passengers riding same, and an endless hand rail mounted at one side of said conveyor member and trained to position the upper run thereof for ready gripping by the passengers when on said member, said hand rail including a hand grip surface that is upwardly disposed in the upper run thereof, the improvement including:

means for guiding a portion of the lower run of said hand rail into juxtaposition with a portion of the lower run of said conveyor member, and means for releasably clamping said hand rail lower run portion to said conveyor member lower run portion for driving said hand rail by said moving means through said conveyor member.

13. The improvement set forth in claim 12 wherein:

said clamping means clamps said hand rail hand grip surface to said conveyor member lower run at said portions thereof.

14. The improvement set forth in claim 12 wherein:

said hand rail includes a serrated undersurface, said guiding means orienting said hand rail lower run portion to bring said hand rail undersurface at said portion thereof into juxtaposition with said conveyor member lower run at said portion thereof.

15. The improvement set forth in claim 12 wherein:

said conveyor member and said hand rail hand grip surface are formed with interlocking indentations that releasably lock together under the action of said clamping means at said portions thereof.

*16. A moving walkway apparatus for conveying passengers comprising:*

*an endless conveyor belt which is resistant to bending laterally thereof while permitting substantial flexure longitudinally thereof,*

*said belt having an upper run and a lower run, support means for supporting said belt for movement,*

*said support means including belt supporting wheels positioned to support the underside of said upper run adjacent the longitudinal extending edges thereof,*

*said wheels having flat faces for supporting engagement with the underside of said belt,*

*and means for driving said belt under tension.*

*17. The apparatus of claim 16 wherein:*

*said upper run of said belt has an inclined portion for conveying passengers between different elevations,*

*a level portion adjacent the upper end of said inclined portion, and a convex portion connecting said level portion to said upper end of said inclined portion,*

*and prop means are positioned to engage said upper run of said belt under said convex portion only along the longitudinal axis of said belt for holding said convex portion of said belt level transversely thereof under the weight of passengers being conveyed thereacross.*

*18. The apparatus of claim 16 wherein:*

*said belt supporting wheels are staggered laterally of said belt at said edges thereof.*

*19. The apparatus of claim 16 wherein:*

*said upper run has an inclined portion for conveying passengers between different elevations, a level portion adjacent the lower end of said inclined portion, and a concave portion connecting said level portion to said lower end of said inclined portion,*

*and hold down means comprising a plurality of rollers engaging the upper surface of said concave portion adjacent the longitudinal extending edges thereof for holding said concave portion down at said edges against the tension of said belt.*

*20. The apparatus of claim 19 wherein:*

*said rollers engage said belt laterally outwardly of the location of said belt supporting wheels on either of said edges of said belt.*

*21. The apparatus of claim 20 further comprising:*

*a trim member covering said rollers and substantially overlying said belt supporting wheels.*

References Cited

The following references, cited by the Examiner, are of record in the patented file of this patent or the original patent.

UNITED STATES PATENTS

| | | | |
|---|---|---|---|
| 2,732,930 | 1/1956 | Thomson | 198—201 |
| 3,170,557 | 2/1965 | Tahenaja et al. | 198—16 |
| 3,191,743 | 6/1965 | Rissler et al. | 198—16 |
| 3,298,495 | 1/1967 | Acton | 198—16 |
| 3,321,060 | 5/1967 | Mullis et al. | 196—16 |
| 3,422,947 | 1/1969 | Kraft | 198—193 |
| 3,381,800 | 5/1968 | Everett | 198—204 |
| 3,195,712 | 7/1965 | Boschi | 198—184 |
| 673,890 | 5/1901 | Reno | 198—16 |
| 3,312,330 | 4/1967 | Juengel | 198—203 |

FOREIGN PATENTS

| | | | |
|---|---|---|---|
| 1,083,536 | 9/1967 | Great Britain | 198—184 |

RICHARD E. AEGERTER, Primary Examiner